United States Patent Office 3,215,489
Patented Nov. 2, 1965

3,215,489
PROCESS OF TREATING CELLULOSE TEXTILE MATERIAL
Bernard H. Kress, Lafayette Hill, Pa., assignor to Quaker Chemical Corporation, a corporation of Pennsylvania
No Drawing. Original application Feb. 18, 1960, Ser. No. 9,446, now Patent No. 3,150,190, dated Sept. 22, 1964. Divided and this application May 18, 1964, Ser. No. 368,343
6 Claims. (Cl. 8—120)

This application is a division of pending application Serial No. 9,446, filed February 18, 1960, now Patent No. 3,150,190, September 22, 1964.

This invention relates to the preparation and use of acetals and polyacetals which are of thermosetting nature.

In my previous Patents Nos. 2,785,949 and 2,786,081 I have disclosed the use of polyols in preparation of linear polyacetals and their use in dimensional control of cellulose fabrics. I have now found that polyol ethers characterized by a minimum of two hydroxyethel groups and a total of at least three primary alcohol groups possess the property when converted into a polyacetal or hemiacetal condensate of imparting crease recovery to cellulose fabrics treated therewith.

An object of this invention is to provide novel polyacetal and hemiacetal condensates which have thermosetting properties.

Another object is to provide cellulose fabrics treated with these novel products and exhibiting excellent crease recovery. Further objects such as the preparation for cellulose textiles of resin finishes having no nitrogen content and thereby being resistant to damage by chlorine bleach, will be apparent.

The novel condensates of my invention are derived from polyols having structures such as the following:

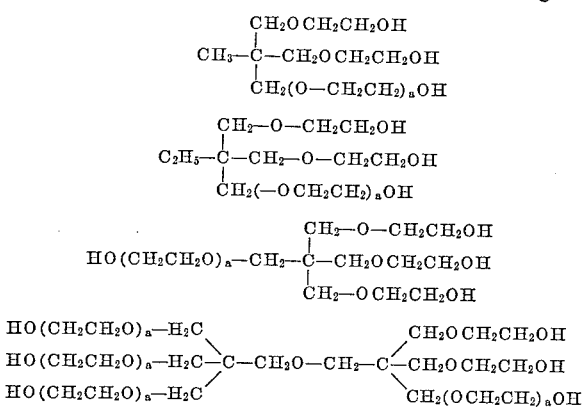

Where $a$ may be 0 or 1.

These are hydroxyethel ethers of trimethylol ethane, trimethylol propane, pentaerythritol and dipentaerythritol and may be prepared readily by reaction of ethylene oxide with those compounds. A minimum of two hydroxyethyl groups is deemed necessary for the trimethylol ethane derived compound and three hydroxyethel groups for the pentaerythritols. In general, such ethoxylated derivatives of pentaerythritol, dipentaerythritol, trimethylolethane, trimethylolpropane and the like are prepared by reaction of these polyhydric alcohols with the requisite amount of ethylene oxide in the presence of an alkaline catalyst. Reaction usually proceeds in such manner as to ethoxylate three of the four hydroxyl groups in pentaerythritol most readily. Thus, the trishydroxyethyl derivative is produced in substantially complete reaction before reaction of ethylene oxide with other hydroxyl groups occurs. Trishydroxyethel pentaerythritol is currently available from the Hercules Powder Company (Wilmington, Del.) under the trade name of "Synthetics F-77." Acidic catalysts are also useful in preparing ethoxylated derivatives of pentaerythritol and its analogs, especially where $a$ in the preceding formulas is equal to 1. See, for example, British Patent 317,770 and U.S. Patent 1,922,459.

Another method for producing the hydroxyethylated intermediates of this invention is by reacting the polyhydric alcohols with the requisite quantity of ethylene carbonate. This type of preparation is illustrated in Example 8 below.

The polyacetal and hemiacetal condensates of my invention are prepared from these polyols by allowing them to react with an aldehyde. The reaction results in the formation of an acetal linkage which may be repeated to form a polyacetal but in some cases it is desirable to maintain a large proportion of hemiacetal groups without conversion to polyacetals. Depending on the nature of the aldehyde the condensate may be formed without the loss of water. Formation of a polyacetal would ordinarily require water to be split out. The essentials of the reaction may be represented by the following scheme:

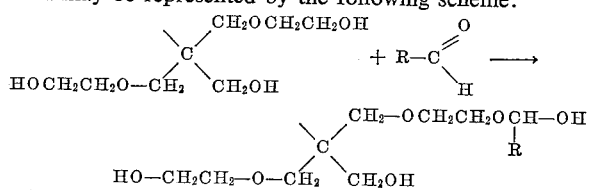

The product in the above scheme (a hemiacetal) may react with itself intermolecularly with loss of water to form a polyacetal. The use of the polyols of the present invention in this reaction can lead to gelled three-dimensional polymers, a result that is quite different from that obtained with polyols such as those referred to in the prior art. Because the reaction may lead quickly to gels and insoluble products it is necessary to exercise control by correct choice of reactants, their proportion and extent of reaction. A further control may be exercised by using varying amounts of less highly functional hydroxyl compounds such as glycols, and less reactive polyols such as sorbitol.

Formaldehyde in the form of formalin, paraformaldehyde, trioxane and other forms may be used to prepare the compositions described herein. Although I prefer to use formaldehyde in one of its forms, I may also employ other aliphatic mono and/or dialdehydes containing from 1 to 8 carbon atoms. Thus, for example, I may use acetaldehyde, propionaldehyde, butyraldehyde, valeraldehyde, heptaldehyde, octaldehyde, glyoxal, succinaldehyde, glutaraldehyde, hydroxy adipaldehyde, and the like.

The alkylene glycol which I prefer to use is diethylene glycol, but other mono and poly alkylene glycols having molecular weights less than 300 may be used, such as dipropylene glycol, triethylene glycol, polyethylene glycol of 200 molecular weight, dibutylene glycol, butylene glycol, pentanediol-1,5, hexylene glycol, and hexanediol-1,6.

The formation of the condensates of my invention takes place when the components are heated together at temperatures from room temperature at 200° C. I may use catalysts of various kinds to acelerate the reaction. An alkaline catalyst is preferable in cases where polyacetal formation is not desirable. Acid catalysts are preferred when polyacetals are desired. p-Toluene sulfonic acid, other acids of Friedel-Craft type catalysts are useful. Thus, polyphosphoric acid, sulfuric acid, alkane sulfonic acids, aluminum chloride, stannic chloride and the like may be used.

The water of condensation is removed by an appropriate method such as refluxing under a trap in the presence of toluene. Similarly water-insoluble azeotroping fluids not reacting with the components may also be used instead of toluene. These include benzene, xylene, paraffin hydrocarbons and saturated cyclic hydrocarbons, as well as esters and the like.

The preparation may be carried out by procedures other than that of azeotroping water of reaction. Thus, removal of water by distillation may also facilitate preparation of these condensates.

In preparing the hemiacetal and polyacetal condensates of my invention it is helpful to apply the theory of polycondensation reactions leading to three-dimensional polymers in order to guide in the choice of reactants, their proportions and the extent to which they are condensed. In general, the polyols of the invention have a functionality greater than two toward an aldehyde. Since they are present in my condensates in considerable amount it is necessary to either keep the extent of polycondensation low, i.e. maintain a preponderance of hemiacetal structure, or to reduce the tendency to gelation by incorporating therein diols or polyols which will not tend to three dimensional polymers. In many cases it is preferable to do both.

In preparing condensates of my invention I combine the aldehyde with the polyol using one, two or three moles of aldehyde per mole of polyol. When the polyol is mixed with some other hydroxyl-containing compound such as an alkylene glycol I may use from two to twenty moles of this compound per mole of polyol.

Thus, for example, for a number of compositions with increasing amounts of polyol replacing a diol in the reaction with formaldehyde the formation of gels takes place at lower and lower extends of reaction as measured by water taken off during the reaction. For many purposes the more useful compositions for application to cellulose fabrics will be those with a decided tendency toward gelatin (and insolubilization therewith) but which possess solubility and fusibility so that they can be handled readily. It should be noted that if only the hydroxyethyl polyol and an aldehyde are allowed to react no water need be removed to obtain a condensate of the hemiacetal type.

The condensates of my invention when applied to cellulose textiles impart a high crease recovery. The reasons for this are not completely known. It should be clear that it does not depend alone on the fact that many of my condensates will form gelled products. The cellulose apparently reacts with my condensates in the curing step which takes place during their application and it has been found that condensates from which all of the water of reaction has been removed impart excellent properties to the cellulose.

The following are illustrative examples of my invention; composition is indicated by parts by weight or by moles.

EXAMPLE 1

|   | Parts |
|---|---|
| Trishydroxyethyl ether of pentaerythritol | 53.2 |
| Diethylene glycol | 106 |
| Paraformaldehyde (91%) | 58 |
| Toluene | 40 |
| p.Toluene sulfonic acid | 0.2 |

The mixture is heated under reflux in the presence of a Dean and Stark trap. After 35 parts of water have been removed by separation in the trap, the toluene is evaporated in vacuuo leaving a somewhat viscous, straw-colored liquid which dissolves in water in low dilution, forming a slightly opalescent solution. Higher concentrations are clear.

Instead of 53.2 parts of the trishydroxyethyl ether of pentaerythritol used above, I may employ 55.5 parts of the dihydroxyethyl ether of trimethylolethane or 59.3 parts of the dihydroxyethyl ether of trimethylolpropane.

EXAMPLE 2

|   | Parts |
|---|---|
| Trishydroxyethyl ether of pentaerythritol | 92 |
| Diethylene glycol | 106 |
| Paraformaldehyde (91%) | 66 |
| Toluene | 40 |
| p.Toluene sulfonic acid | 0.2 |

Upon reflux in the presence of a Dean and Stark trap, 42 parts of water were removed. After evaporation of the toluene a viscous straw-colored liquid remained which was soluble in water.

Instead of 66 parts of paraformaldehyde, I may use 387 parts of a 30% aqueous solution of glyoxal or 800 parts of a 25% aqueous solution of glutaraldehyde. Two hundred and seventy-one parts and 600 parts of water are removed, respectively.

A similar product was prepared by replacing the paraformaldehyde above 228 parts of heptaldehyde, the product being insoluble in water, but soluble in such organic solvents as toluene and butyl acetate.

EXAMPLE 3

Three experiments (A, B, C) were run, each using the amounts shown:

106 parts (1.0 mole) diethylene glycol
76.2 parts (2.3 moles) formaldehyde (91%) as paraformaldehyde
85.7 parts (0.32 moles) Synthetics F-77
40 parts toluene
0.1 part p.toluene sulfonic acid The mixtures were heated to reflux under a Dean and Stark trap to remove water, including water of reaction. The amount of water collected was compared with the theoretical amount.

| Experiment | Water collected, percent of theory | Remarks |
|---|---|---|
| A | 87.5 | Gelled. |
| B | 75.0 | Gelled. |
| C | 50.0 | Water soluble. |

As I have discussed generally above, in order to obtain a material which is water-soluble so that it may be applied to textiles, care must be taken with ratio of reactants. If formaldehyde content is increased, a thermoset gel may be obtained. Control of composition is illustrated in Examples 4 and 5 below.

EXAMPLE 4

|   | Parts |
|---|---|
| Trishydroxyethyl ether of pentaerythritol | 92 |
| Diethylene glycol | 106 |
| Paraformaldehyde (91%) | 77 |
| Toluene | 40 |
| p.Toluene sulfonic acid | 0.2 |

The product is heated under reflux in the presence of a Dean and Stark trap. After 30 parts of water had been removed, the toluene was evaporated in vacuo to leave a somewhat viscous liquid which was water-soluble.

Instead of 92 parts of the trishydroxyethyl ether of pentaerythritol used above, I may employ 95 parts of the dihydroxyethyl ether of trimethylolethane or 102 parts of the dihydroxyethyl ether of trimethylolpropane.

EXAMPLE 5

The same composition as above was refluxed until 43 parts of water had been removed at which point the entire mass set to a water-insoluble, clear, rubbery gel. The product was not soluble in organic solvents either.

These examples show that the amount of water removed in the reaction is significant. This is directly proportional to the molecular weight obtained before gelation.

Similarly an increase in aldehyde and hydroxyethyl-containing polyol content increases cross linking and hence molecular weight and gelation as shown in the next example.

EXAMPLE 6

A number of experiments were made using paraformaldehyde, Synthetics F-77, diethylene glycol and reacting as in Example 3. The state of the product and the amount of reaction (percent of theory) were noted. The data and results are in the table below:

Table 1
POLYACETAL CONDENSATES

| | Components | | | Reaction, percent | Product |
|---|---|---|---|---|---|
| | Diethylene glycol, moles | Formaldehyde, moles | Polyol, moles | | |
| (a) | 1.0 | 1.2 | 0.05 | 100 | Soluble. |
| (b) | 1.0 | 1.3 | 0.8 | 100 | Do. |
| (c) | 1.0 | 1.5 | 0.5 | 100 | Do. |
| (d) | 1.0 | 1.8 | 0.4 | 70 | Soluble and viscous. |
| (e) | 1.0 | 1.9 | 0.23 | 87.5 | Gelled. |
| (f) | 1.0 | 2.3 | 0.32 | 87.5 | Do. |
| (g) | 1.0 | 2.5 | 0.375 | 50.0 | Do. |

The alkylene glycol need not be present at all or present in small quantity if little or no water of condensation is to be removed. These preparations consist mainly of hemiformals.

EXAMPLE 7

134 parts of trishydroxyethyl ether of pentaerythritol
66 parts of paraformaldehyde (91%)
0.1 part of 50% NaOH solution The mixture was refluxed to form a water white liquid.

Instead of 134 parts of trishydroxyethyl ether of pentaerythritol I may use in the above example 143.5 parts of dihydroxyethyl ether of trimethylolethane or 146.5 parts of dihydroxyethyl ether of trimethylolpropane.

The hydroxyethyl compositions may be prepared by means other than that of ethylene oxide condensation. This is shown in the example below.

EXAMPLE 8

102 parts of dipentaerythritol
212 parts of ethylene carbonate
0.05 part potassium carbonate The mixture was heated with stirring at about 165° C. The dipentaerythritol dissolved and there was vigorous evolution of carbon dioxide. The brown solution evolved $CO_2$ while heating was continued to 200° C. After two hours the $CO_2$ evolved very slowly and heating was discontinued. The yield of neutralized product was about 99% of theory.

EXAMPLE 9

| | Parts |
|---|---|
| Preparation in Example 8 | 52 |
| Diethylene glycol | 106 |
| Paraformaldehyde (91%) | 58 |
| Toluene | 40 |
| p.Toluene sulfonic acid | 0.2 |

The mixture was refluxed in the presence of a moisture trap. When 30 parts of water were removed the toluene was evaporated, leaving a straw-colored, slightly viscous liquid which in low concentration in water forms an opalescent solution.

In forming the condensates of my invention I may use mixtures of the hydroxyethyl polyols with other polyols. These polyols may be used up to an equal weight of the hydroxyethyl compound.

EXAMPLE 10

| | Parts |
|---|---|
| Trishydroxyethyl pentaerythritol ether | 26.6 |
| 1,2,6-hexanetriol | 26.8 |
| Diethylene glycol | 106 |
| Paraformaldehyde (91%) | 73 |
| Toluene | 40 |
| p.Toluene sulfonic acid | 0.2 |

The mixture above was heated in the presence of a moisture trap and water removed azeotropically. When 43 parts of water had been removed, the toluene was evaporated leaving a slightly viscous straw-colored liquid.

Other polyols which may be used in admixture with the hydroxyethyl ethers include glycerine, sorbitol, mannitol, pentaerythritol, dipentaerythritol, inositol, sucrose, glucose and the like. As a class polyols having 3 to 10 carbon atoms and 3 to 6 hydroxyl groups are useful. Of course, mixtures of hydroxyethyl ethers may be used in preparing the products of this invention.

The compositions are used to impart crease recovery higher than that obtained by use of the polyformals described in U.S. Patents 2,785,949 and 2,786,081. The products, properly cured, impart dimensional control and greater crease recovery without any chlorine damage. The following test procedures were used in the examples below.

*Shrinkage.*—American Association of Textile Chemists and Colorists—1952—Standard Test Method 14–52

*Crease recovery.*—Ibid p. 88, tentative 66–52

*Tensile strength.*—Federal Spec. CCC–T–191B, Method 5102, 2″ width

The products are applied generally as follows: Solutions containing 0.5 to 50% by weight of the acetal and catalyst in the amount of from 5 to 200% by weight of the acetal are padded on to the fabric at 100% wet pickup, using a laboratory textile padder. The fabric is then placed on a pin frame; dried at 180° F. and cured at 325° F. for 90 seconds. The fabric is then lightly afterwashed at moderate temperatures, pressed, conditioned at 65% relative humidity at 70° F.

The results shown in the table below are for 80 x 80 cotton sheeting. Although the following results were obtained with 100% wet pickup, it is to be understood that, in accordance with normal textile finishing practice, any desired wet pickup may be employed.

EXAMPLES 11–13

| Example | Product | Percent | Catalyst | Percent | One 212° F. Wash | | Warp and Fill Monsanto Crease Recovery |
|---|---|---|---|---|---|---|---|
| | | | | | Percent Warp Shrinkage | Warp Tensile, Lbs. | |
| No. 11 | Ex. 1 | 10.0 | $MgCl_2 6H_2O$ | 4 | 1.8 | 42.5 | 254 |
| No. 12 | Ex. 2 | 10.0 | $MgCl_2 6H_2O$ | 4 | 1.7 | 41.0 | 267 |
| No. 13 | Ex. 1 (U.S. 2,786,081) | 10.0 | $MgCl_2 6H_2O$ | 4 | 2.0 | 40.0 | 190 |
| | None | | | | 4.5 | 73 | 155 |

Although no additives were used in the padding baths shown in the preceding table, starches, gums, dextrines, textile softeners, stiffeners, water repellents, fire retardants, other resins such as vinyl and acrylic polymers and copolymers, and the like, may be used in the bath along with the products of this invention. Any suitable acidic catalyst may be used to effect cure on the fabric. This includes magnesium chloride, zinc nitrate (and mixtures containing these salts), amine hydrochlorides, ammonium halides and phosphates, acidic aluminum salts, zinc chloride in combination with acids such as acetic, formic, hydroxyacetic and diglycolic, fluoborates, silico fluorides, oxalic acid and other catalysts which will effect cure. The time of cure of the cellulose fabric varies inversely as the temperature and inversely with catalyst concentration. There is also an inverse relationship between catalyst and cure temperature.

Mixtures containing the hydroxyethyl compositions described above and other polyols may be used to prepare fabric according to this invention. The products are applicable to regenerated cellulose such as viscose rayon.

EXAMPLE 14

Rayon challis was treated as in Example 11.

After curing the fabric was wrinkle-resistant and possessed a pleasing resilience. Untreated fabric showed considerable wrinkling and no resilience.

A number of compositions were prepared and evaluated for crease recovery on 80 x 80 cotton sheeting. The treatments were made by impregnating the sheeting with 10% solutions of the condensates obtained by reacting (a) one part by weight of a tris hydroxyethyl ether of pentaerythritol having at least three hydroxyethyl groups and at least three primary alcohol groups, (b) one tenth to 15 parts by weight of formaldehyde and (c) 0.5 to 20 parts by weight of diethylene glycol, using an acidic catalyst. In the following Table II the reactants are given in molar amounts, using p.toluene sulfonic acid catalyst and the procedure as given in Example 3. The treating baths contained 8% by weight magnesium chloride $$(MgCl_2 \cdot 6H_2O)$$

or 1.5% by weight of zinc chloride. The impregnated fabric was dried at 180° F. under warp tension and cured for 90 seconds at 325° F. under relaxed conditions. Crease recovery was evaluated as in Examples 11 through 13.

*Table II*

CREASE RECOVERY OF TREATED 80 x 80 COTTON SHEETING TREATED WITH POLYACETAL CONDENSATES.

| Example | Condensate (All contained diethylene glycol 1 mole) | | | Crease Recovery— Monsanto (Warp + Fill) |
|---|---|---|---|---|
| | Formald. | Polyol | Percent Reacted | |
| 15 | 1.0 | 0.08 | 100 | 218 |
| 16 | 1.1 | 0.02 | 100 | 229 |
| 17 | 1.1 | 0.16 | 100 | 229 |
| 18 | 1.2 | 0.05 | 100 | 235 |
| 19 | 1.3 | 0.07 | 100 | 239 |
| 20 | 1.25 | 0.10 | 87.5 | 229 |
| 21 | 1.43 | 0.11 | 87.5 | 233 |
| 22 | 1.43 | 0.20 | 87.5 | 250 |
| 23 | 1.47 | 0.12 | 87.5 | 247 |
| 24 | 1.79 | 0.197 | 87.5 | 243 |
| 25 | 1.92 | 0.231 | 87.5 | 255 |
| 26 | 2.5 | 0.375 | 87.5 | 268 |
| 27 | 1.67 | 0.133 | 75 | 244 |
| 28 | 1.67 | 0.233 | 75 | 255 |
| 29 | 2.0 | 0.28 | 50 | 253 |
| 30 | 2.3 | 0.39 | 50 | 258 |
| 31 | 2.5 | 0.20 | 50 | 258 |

The present invention is adapted for the treatment of various cellulose textile materials.

The term "cellulose textile material" is intended to include filaments and fibers, staple or yarns, whether in finished stages or at some intermediate stage in the production thereof, of the group consisting of natural cellulose, regenerated cellulose, such as viscose rayon, cuprammonium rayon, and hydrolyzed cellulose acetate, and mixtures thereof with other natural and synthetic fibers, such as cellulose acetate, nylon, wool, etc. Blends of cotton and/or rayon textiles and blends containing the cellulosic fiber and wool, nylon, polyacrylonitrile polymers, copolymers, and "alloys," polyester fiber, polyvinyl and polyvinylidene cyanide, silk, protein fiber, cellulose acetate and the like are also to be construed as within the scope of this term, as well as fabrics, whether woven or nonwoven, and paper which may also be treated advantageously with the preparations disclosed herein. The products of this invention may also be used in preparing thermosetting molding compositions and coating preparations.

I claim:
1. The process of treating a cellulose textile material which comprises (1) applying to the cellulose material from an aqueous bath containing an acidic catalyst, a composition comprising the condensation product made by reacting at temperatures between room temperature and 200° C. (a) a hydroxy ethyl ether of a polyol, said ether having two to six hydroxyethyl groups and three to six primary alcohol groups, said polyol being selected from the group consisting of trimethylol ethane, trimethylol propane, pentaerythritol and dipentaerythritol, and (b) per mole of said ether from one to three mols of an aldehyde selected from the group consisting of aliphatic mono- and dialdehydes having 1 to 8 carbon atoms; and (2) heating the treated cellulose material to cure said condensation product.

2. The process of treating a cellulose textile material as defined in claim 1, wherein the composition comprising the condensation product includes as an additional reactant a polyol having 3 to 10 carbon atoms and 3 to 6 hydroxyl groups to reduce the gelatin tendency of the composition in amount from two to twenty moles per mole of the said ether.

3. The process of treating a cellulose textile material as defined in claim 1, wherein the composition comprising the condensation product includes as an additional reactant an alkylene glycol having a molecular weight not greater than 300 to reduce the gelation tendency of the composition in amount from two to twenty moles per mole of the said ether.

4. The process of treating a cellulose textile material which comprises (1) applying to the cellulose material from an aqueous bath containing an acidic catalyst, a composition comprising the condensation product made by reacting at temperatures between room temperature and 200° C. (a) one part by weight of a tris hydroxyethyl ether of pentaerythritol having three to six hydroxyethyl groups and three to six primary alcohol groups, (b) one tenth to 15 parts by weight of formaldehyde, and (c) 0.5 to 20 parts by weight of diethylene glycol; and (2) heating the treated cellulose material to cure said condensation product.

5. Cellulose textile material treated by the process of claim 1.

6. Cellulose textile material treated by the process of claim 2.

References Cited by the Examiner

UNITED STATES PATENTS

| 2,786,081 | 3/57 | Kress | 8—116 X |
| 2,878,294 | 3/59 | Kress | 8—116 X |
| 2,968,581 | 1/61 | Kress | 8—116 X |

NORMAN G. TORCHIN, *Primary Examiner.*